United States Patent [19]

Calhoun et al.

[11] Patent Number: 5,308,667
[45] Date of Patent: May 3, 1994

[54] ELECTRICALLY CONDUCTIVE ADHESIVE WEB

[75] Inventors: Clyde D. Calhoun, Grant Township, County of Washington; Maurice J. Fleming, Cottage Grove; Miroslav Tochacek, Woodbury, all of Minn.

[73] Assignee: Minnesota Mining and Manufacturing Company, St. Paul, Minn.

[21] Appl. No.: 962,523

[22] Filed: Oct. 16, 1992

[51] Int. Cl.⁵ .............................. C09J 7/02; C09J 9/02
[52] U.S. Cl. .................... 428/40; 174/117 A; 174/117 M; 174/117 R; 174/117 F; 174/84 R; 428/102; 428/104; 428/246; 428/251; 428/261; 428/286; 428/289; 428/311.1; 428/317.3; 428/328; 428/343; 428/354; 428/355; 428/356
[58] Field of Search ............. 428/40, 343, 354, 317.3, 428/102, 103, 104, 344, 355, 350, 328, 311.1, 409, 379, 389, 246, 251, 261, 286, 289; 174/117 A, 117 M, 117 F, 84 R, 117 R

[56] References Cited

U.S. PATENT DOCUMENTS

| | | | |
|---|---|---|---|
| 2,071,322 | 2/1937 | Balfe | 288/1 |
| 2,822,509 | 2/1958 | Harvey | 317/2 |
| 3,347,978 | 10/1967 | Simon | 174/35 MS |
| 3,514,326 | 5/1970 | Stow | 174/117 A |
| 3,515,270 | 6/1970 | Tonn et al. | 206/56 |
| 3,681,179 | 8/1972 | Theissen | 161/4 |
| 3,762,946 | 10/1973 | Stow et al. | 117/227 |
| 4,008,300 | 2/1977 | Ponn | 264/104 |
| 4,199,637 | 4/1980 | Sado | 428/119 |
| 4,223,067 | 9/1980 | Levens | 428/308 |
| 4,374,883 | 2/1983 | Winslow | 428/40 |
| 4,442,314 | 4/1984 | Piper | 174/117 M |
| 4,457,796 | 7/1984 | Needham | 156/182 |
| 4,548,862 | 10/1985 | Hartman | 428/323 |
| 4,606,962 | 8/1986 | Reylek et al. | 428/148 |
| 4,767,653 | 8/1986 | Renstrom | 428/355 |
| 4,931,598 | 6/1990 | Calhoun et al. | 174/117 F |
| 5,017,255 | 5/1991 | Calhoun et al. | 156/230 |
| 5,028,490 | 7/1991 | Koskenmaki et al. | 428/594 |
| 5,059,262 | 10/1991 | Calhoun et al. | 156/47 |
| 5,071,699 | 12/1991 | Pappas | 428/265 |
| 5,087,494 | 2/1992 | Calhoun et al. | 428/40 |
| 5,116,678 | 5/1992 | Knutson | 428/354 |
| 5,124,198 | 6/1992 | Koskenmaki et al. | 428/285 |

FOREIGN PATENT DOCUMENTS 0330452 2/1989 European Pat. Off. ......... C09J 7/02

*Primary Examiner*—Ellis P. Robinson
*Assistant Examiner*—Nasser Ahmad
*Attorney, Agent, or Firm*—Gary L. Griswold; Walter N. Kirn; James V. Lilly

[57] ABSTRACT

A web of adhesive, especially a normally tacky and pressure-sensitive adhesive, is rendered electrically conductive by imparting a pattern of electrically conductive elements that extend from slightly beyond one face of the web to slightly beyond the other face of the web. In a preferred embodiment, the adhesive web is sandwiched between release liners formed of uniaxially oriented film and a conductive thread stitched through both the liners and the adhesive web. The liners can be removed, tearing along the stitch lines, to create an electrically conductive adhesive web.

15 Claims, 1 Drawing Sheet

ELECTRICALLY CONDUCTIVE ADHESIVE WEB

FIELD OF THE INVENTION

This invention relates to electrically conductive adhesive webs and to methods of making them. In one embodiment, the invention relates to such webs where the adhesive is normally tacky and pressure-sensitive, preferably aggressively tacky.

BACKGROUND OF THE INVENTION

For many years there have been attempts to devise adhesives that possess electrical conductivity, and numerous U.S. patents have been issued on such products, representative examples of which will now be mentioned For example, U.S. Pat. No. 3,347,978 discloses electrically conductive joints and gaskets where an adhesive containing a mass of electrically conductive fibers is used to bond two metal members. U.S. Pat. No. 4,008,300 discloses a foraminous elastomeric film in which the perforations are filled with a hardened electrically conductive adhesive slurry that bulges beyond both faces of the elastomer. In the field of pressure-sensitive adhesives (PSAs), U.S. Pat. No. 2,822,509 discloses an adhesive plaster having a conductive backing and an adhesive containing conductive particles. U.S. Pat. Nos. 3,762,946 and 4,548,862 teach the incorporation of chains of electrically conductive particles extending between the faces of a PSA layer. U.S. Pat. No. 4,606,962 describes a pressure-sensitive adhesive layer incorporating conductive metal-coated particles, somewhat thicker than the adhesive layer. U.S. Pat. No. 4,457,796 discloses a PSA transfer adhesive containing chopped metal fibers to impart localized electrical conductivity.

Where it is important to have an adhesive that possesses both good electrical conductivity and good adhesion, most of the adhesive constructions discussed in the preceding paragraph have been confronted by a serious problem. If a large quantity of conductive particles or fibers is blended with the adhesive, electrical conductivity is excellent, but adhesive properties are significantly reduced. On the other hand, if a small quantity of conductive fibers or particles is incorporated in the adhesive, adhesion properties may be adequate but electrical conductivity is often too low to be acceptable for the intended use. The foregoing problem is exacerbated as the adhesive layer increases in thickness.

In the manufacture of refrigerators, washing machines, dryers, and the like, metal panels are typically spot welded or riveted together to form the enclosure for the appliance. While these methods of joining the panels provide both mechanical strength and electrical continuity, skilled operators are required, and the inevitable disruption of the metal surface requires an abrading operation to restore adequate smoothness. It has been recognized that an aggressive adhesive construction having excellent electrical conductivity would be more convenient to use, but no such adhesive construction has heretofore been available.

BRIEF SUMMARY

The present invention provides adhesive webs having both excellent adhesive properties and excellent electrical conductivity, a presently preferred embodiment being a PSA transfer adhesive. However, as will be shown hereinafter, other embodiments of the web of the invention are also included in the invention. Furthermore, the invention also includes novel methods of making such products.

More specifically, the invention provides an electrically conductive web, adhesive on at least one face (preferably both faces), having a pattern of an electrically conductive thread extending through the web and lying along each face, said thread being exposed at both surfaces of the web. In the presently preferred embodiment of the invention, the threads are stitched through the adhesive web. The stitching process may be carried out without having the web adhere to the equipment by steps comprising (a) providing a web having a tacky adhesive on at least one face, (b) rendering the adhesive surface (or surfaces) of the web temporarily non-tacky, and (c) stitching at least one conductive thread through the temporarily non-tacky web. When it is desired to use this product, the tacky nature of the surface is first restored. The web can be rendered temporarily non-tacky in a number of ways, e.g., by lowering the temperature of the web, by applying a coating of soluble non-tacky material, or preferably by applying a release liner to the exposed surface or surfaces of the web. When the electrically conductive web is to be used, the tacky condition of the surface is restored; in the three cases just mentioned, this can be accomplished, respectively, by warming the web, by dissolving the soluble coating, or by removing the release liner.

BRIEF DESCRIPTION OF THE DRAWING

Understanding of the invention will be facilitated by referring to the accompanying drawing, in which like numbers refer to like parts in the two views, and in which.

DETAILED DESCRIPTION

Figure 1:
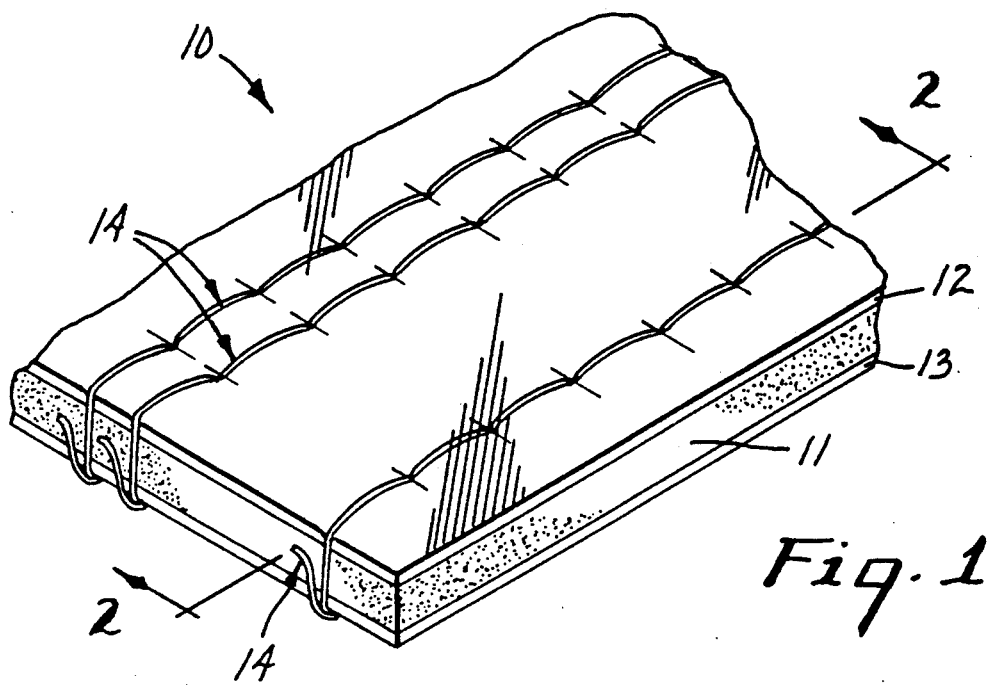
FIG. 1 is a greatly enlarged perspective view of a conductive adhesive made in accordance with the invention, showing the presence of a release liner on each face.
Figure 2:
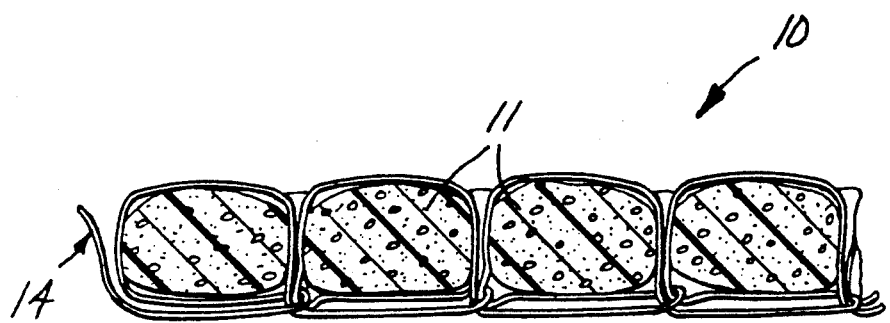
FIG. 2 is a somewhat stylized cross-sectional view of the conductive adhesive of FIG. 1, showing the product after the liners have been removed.

Referring now to the drawing, although adhesive layer 11 may comprise a hot melt adhesive that is not tacky at room temperature or a B-stage curable adhesive (e.g, an epoxy resin), it is generally preferred to employ a PSA, which can be quickly and easily applied in a desired location without the necessity for curing or the application of heat. PSAs, as is well known, can be modified to provide a degree of adhesion suitable for the particular application at hand. The choice of the particular PSA depends upon the type of surface to which it is to be adhered, but any of the known classes of PSA's will work in the present invention. These classes of PSA's include acrylate, silicones, natural rubber, block copolymer, urethane and the like. Useful PSAs are disclosed in (1) U.S. Pat. NO. 4,374,883 (see, for example, Column 7, Table II), (2) *A Formulary of Adhesive and Other Sealants*, compiled by Michael and Irene Ash, Chemical Publishing Co., Inc., New York (1987), (see Chapter IV), and (3) *Handbook of Pressure Sensitive Adhesive Technology*, Donatas Santas, 2nd Edition, Van Nostrand Reinhold, New York (1989).

Suitable PSA's can be provided as thin transfer tapes or on thick substrates such as urethane foams, acrylic foams, vinyl foams, polyethylene foams, and the like. When the adhesive is to be adhered to a fairly smooth surface, a thin transfer tape would be adequate. If the surface is rough, it may be desirable to use a foam tape to help the adhesive conform to the surface to provide better adhesion. Examples of commercially available tapes that can be used for the present invention are available from Minnesota Mining and Manufacturing Company and include Scotch brand adhesive transfer tapes, Scotch brand double coated tapes, Scotch-Mount brand double coated foam tapes, Scotch brand VHB tapes and Scotchfoam brand single coated foam tapes.

In the drawing, conductive adhesive web 10 comprises adhesive layer 11, through which extend electrically conductive threads 14. As threads 14 pass through adhesive layer 11, they effectively constitute conductive "pillars" joining the two faces of layer 11. The portions of threads 14 that lie along each face are exposed, that is they are available for direct electrical contact, in the plane of the face. Preferably the portions of threads 14 that lie along each face extend slightly above the surface of layer 11 and are in a position to ensure good electrical contact with an electrically conductive substrate against which adhesive web 10 is placed. At the same time, most of the surface of layer 11 is exposed and thus provides excellent adhesive contact with the substrate.

FIG. 1 depicts an embodiment in which adhesive layer 11 is sandwiched between removable release liners 12 and 13 before conductive threads 14 are stitched through the entire sandwich. The presence of release liners 12 and 13 effectively temporarily deactivates the surface of adhesive layer 11 so that it will not stick to the stitching machine that is used to stitch threads 14 through it. In this embodiment of the invention, it is highly desirable to employ a release liner that is uniaxially oriented in a direction parallel to that in which the stitch lines extend, so that when the liners are removed to permit use of adhesive layer 11, the liners tear, or fibrillate, along the stitch lines, rather than either being held in place by the stitching or causing adhesive layer 11 to tear during the process of removal. Representative examples of materials that may be oriented to provide the liner include polyolefins (e.g., polyethylene and polypropylene) and polyester (e.g., poly(ethylene terephthalate)). The surface of the liner may be treated, if desired, to improve the release of the liner from the adhesive layer.

Conductive threads 14 may be formed from fine metal wires or a blend of fine metal fibers, such as stainless steel, with a conventional textile fiber. Alternatively, they may be formed of a textile fiber, e.g., nylon, that has been metallized with a conductive metal such as silver. Although, of course, other metals may be used for this purpose, silver has the advantage that its oxide is also electrically conductive, a characteristic not possessed by such metals as copper. Certain graphite fibers may also be useful for this purpose.

Figure 3:
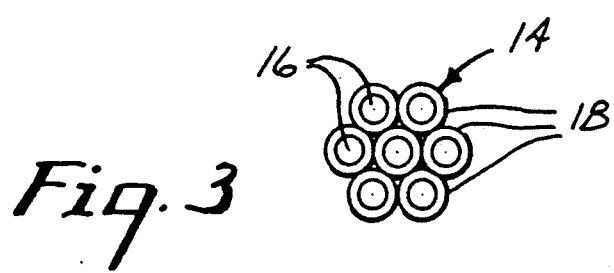
FIG. 3 is an end view of a conductive thread formed from a multifilament yarn comprising a bundle of textile fibers each of which has been metallized with conductive metal.

FIG. 3 depicts an end view of a conductive thread 14 formed from a number of individual textile fibers 16 each coated with a layer of conductive metal 18. This embodiment of conductive thread 14 may comprise a plurality of individual metallized fibers twisted together.

Other methods of temporarily deactivating, or de-tackifying, a PSA layer may be employed. For example, the surfaces of adhesive layer 11 may be coated with a soluble substance such as polyvinyl alcohol prior to the stitching operation, after which the coating may be dissolved to re-expose the adhesive surface. This method of temporarily deactivating a PSA surface is generally taught in U.S. Pat. Nos. 3,515,270 and 3,681,179. In some cases, this method may tend to degrade the adhesive properties of layer 11 and is thus not presently preferred.

Another method of temporarily deactivating the surface of adhesive layer 11 is to cool it below a temperature that is 25° C. above its glass transition temperature, permitting stitching of the adhesive layer to take place without difficulty. When reference is made to deactivating a PSA layer by chilling, it should be recognized that an adhesive may not be tacky and pressure-sensitive at room temperature but may become so when raised to a higher temperature.

It may also be possible to process adhesive layer 11 in a stitching operation by interposing a stream of air between layer 11 and the substrate upon which stitching is taking place, thereby creating a sort of air bearing.

The previous discussion of adhesive layer 11 has been on the basis that it was continuously adhesive through its thickness. It will be readily appreciated that a double-coated tape, of the type where a backing or other non-adhesive structure is coated on one or both sides with an adhesive such as a normally tacky and pressure-sensitive adhesive could be used in the same manner.

Certain physical and electrical tests have been found helpful in evaluating the ability of a given adhesive structure to perform effectively in the end use for which it is intended. For convenience in reference, these tests will be discussed briefly below:

Peel Adhesion. The force required to strip the adhesive from a stainless steel test panel at 90° at a rate of 300 mm/minute is determined generally in accordance with ASTM Test No. D3330-87, Method B, with the following modifications: (1) test panels are cleaned with a 1:1 isopropanol:water blend, (2) the polyester film that would be adhered to one face of the adhesive is replaced with a degreased 0.127 mm anodized aluminum foil such as Alcoa 1100 Alloy, (3) a 6.8 kg, 127 mm diameter steel roller is used to force the foil-backed adhesive into contact with the stainless steel test panel, (4) a 72 hour dwell time occurs prior to testing, (5) the test panel holder permits the foil-backed adhesive to be peeled away at 90° rather than 180°, and (6) the peel rate is 300 mm/minute rather than 30 mm/minute. Results are reported in Newtons per decimeter (N/dm).

Normal Tensile Strenoth. In this test, the maximum tensile load per unit area to rupture the adhesive is determined generally in accordance with ASTM Test No. D897-78. Two aluminum T-blocks having 25.4 mm×25.4 mm faces are joined together by the adhesive to be tested, after which the blocks are mounted in the upper and lower jaws, respectively, of a tensile tester and separated, recording the peak force to rupture the adhesive. This test deviates from the ASTM test in the following particulars: (1) test surfaces are cleaned with a 1:1 isopropanol:water blend, (2) T-blocks are aluminum, (3) the adhesive on a liner is adhered to one block and the excess trimmed away with a razor blade, (4) the adhesively joined blocks are forced together with an 11.3 kg static load for 15 seconds, (5) a 72 hour dwell time occurs prior to testing, (6) self-aligning hooks are used to mount the blocks in the jaws of the tensile tester, and (7) the rate of jaw separation is 50 mm/minute. Results are reported in kiloPascals (kPa).

Static Shear. This test measures the time before an adhesive fails when subjected to a constant shearing stress, generally in accordance with ASTM Test No. D3654M-88, with the following modifications: (1) test panels and straps are cleaned with a 1:1 isopropanol:water blend, (2) adhesive area is 12.7 mm × 25.4 mm, dimensions respectively in the horizontal and vertical planes, (3) the test panel is a 1.6 mm thick Type 302 or 304 stainless steel with a bright annealed finish, (4) a 0.8 to 1.6 mm thick stainless steel test strap, 50 mm long, with a 6.35 mm hole centered at one end is employed, (5) the prepared sample is laid horizontal and a 1 kg weight applied to the bonded area for 15 minutes, after which the weight is removed and the sample allowed to dwell 72 hours at room temperature, and (6) the samples were placed in a vertical holding apparatus and allowed to dwell 10 minutes at room temperature before hanging a 1 kg weight on the strap. Time before failure is reported in minutes; if no failure occurs in 10,000 minutes, the time is reported as "P".

Dynamic Shear. This test, which measures the force per unit area at which a lap splice fails when subjected to a constant rate of shear, is conducted generally in accordance with ASTM Test No. D1002-73, with the following modifications: (1) test straps are cleaned with a 1:1 isopropanol:water blend, (2) overlap joint area is 25.4 mm × 25.4 mm, (3) test straps are Type 302 or 304 stainless steel, 1.6 mm thick and 75 mm long, with a 6.35 mm hole centered at one end, (4) joint is rolled once in each lengthwise direction with a 6.8 kg 127 mm diameter steel roller, (5) specimen is allowed to dwell 72 hours at room temperature before testing, (6) holes in straps are engaged by self-centering hooks in jaws of test machine, and (7) jaw separation rate is 12.7 mm/minute. Results are reported in kPa at failure.

Resistance. This test measures the resistance of the adhesive splice. A 2.5 cm × 15 cm strip of adhesive is interposed between two clean 5 cm × 25 cm × 0.03 mm stainless steel panels, the adhesive-free ends of the panels extending in opposite directions. The probes of an ohmmeter are respectively placed in contact with one panel adjacent the end of the adhesive and the other panel adjacent the opposite end of the adhesive. Resistance is reported in milliOhms (mOhms).

The invention will now be described with the aid of illustrative but nonlimiting examples in which all parts and percentages are by weight unless otherwise noted.

EXAMPLES 1-4

For each of these examples there was first obtained a roll of Scotch Brand VHB Double Coated Acrylic Foam Tape No. 4950. The differential release liner of the tape was removed and replaced with uniaxially lengthwise oriented 33 μm thick polypropylene release liners (5–7:1 orientation). For each of Examples 1–4, the liner-adhesive-liner sandwich was then chain stitched in the lengthwise direction, using silver coated nylon thread (available from Sauquoit Industries, Scranton, Penn.). The chain stitching was effected in rows alternately 10 mm and 30 mm apart, the stitch density being 2/cm. In Examples 1 and 2, the thread was characterized by the manufacturer as 125 denier/17 filaments, having a resistance of about 40 ohms/cm. In Examples 3 and 4 the thread was made up of two component yarns, each 125 denier/17 filaments. After stitching, the liners could be fairly easily removed as they split along the stitch lines (which, it will be recalled, were parallel to the direction of orientation). To make such a product convenient for the end user, the liners could then be replaced with non-oriented liners that overlie both the adhesive and the silver-coated threads.

The products of Examples 1–4 were then slit into 2.54 cm strips, half of which were tested as previously described and half of which were first placed in a 70° C. oven for 24 hours. The products of Examples 1 and 3 had one stitch line per strip, while the products of Examples 2 and 4 had two stitch lines per strip. As a control, there was included a sample of the unmodified (i.e., non-stitched) Scotch Brand VHB Double Coated Acrylic Foam No. 4950. Where tests were repeated, an average of the two values obtained has been used. In all cases, results have been rounded off to the nearest whole number. Results are tabulated below:

TABLE I

| | Examples | | | | |
|---|---|---|---|---|---|
| | 1 | 2 | 3 | 4 | Control |
| Peel (N/dm) | | | | | |
| R.T. | 452 | 380 | 545 | 503 | 460 |
| 70° C. | 750 | 736 | 824 | 814 | 888 |
| Normal Tensile (kPa) | | | | | |
| R.T. | 35 | 48 | 46 | 46 | 75 |
| 70° C. | 59 | 49 | 66 | 50 | 87 |
| Static Shear (min) | | | | | |
| R.T. | P | P | P | P | P |
| 70° C. | 8380 | 8380 | P | 5496 | 8798 |
| Dynamic Shear (kPa) | | | | | |
| R.T. | 346 | 263 | 409 | 468 | 363 |
| 70° C. | 758 | 530 | 741 | 729 | 539 |
| Resistivity (R in mOhms) | 65 | 18 | 17 | 11 | ∞ |

The foregoing table shows that, although the physical properties of the products of Examples 1–4 are somewhat lower than those of the control, they are still high enough to be considered satisfactory. More importantly, however, it will be noted that the conductivity of the products of the Examples (as indicated by their extremely low resistance) is significantly better than that of the control, the resistance of which is infinite.

Those skilled in the art will immediately recognize that numerous embodiments of the invention, other than those specifically mentioned, may be employed within the spirit of what has been taught. To illustrate only a few: Conductive yarn or threads may be tufted through the adhesive layer, or a conventional sewing machine may be used. Other thermoplastic or thermosetting adhesives can be substituted for the PSAs of the examples. When comparatively thick adhesive layers are desired, two or more adhesive layers may be laminated together. Stitching may be accomplished in zigzag fashion where no release liners are present, since there is then no difficulty of liner removal; this construction not only has multidirectional conductivity but also permits a larger area of conductivity. In another embodiment, only one side with the adhesive may have stitches which are parallel to the direction of a liner orientation while the other side has stitches which are present in a zigzag 0 fashion. Other alternatives will doubtless occur to those who read the foregoing disclosure.

What is claimed is as follows:

1. An electrically conductive web having opposed parallel faces and being adhesive on at least one face, the web having a stiched pattern of continous electricaly conductive thread extending therethrough and lying along each face, said thread being exposed at both faces of the web.

2. The web of claim 1 wherein the pattern of electrically conductive thread extends from slightly beyond one face of said web to slightly beyond the other face of said web.

3. The web of claim 1 wherein the thread contains metal fibers.

4. The web of claim 1 wherein the thread is formed from textile fibers and provided with a metallized surface coating.

5. The web of claim 4 wherein the thread is formed from nylon fibers and provided with a silver coating.

6. The web of claim 1 wherein the thread comprises metal wire.

7. The web of claim 1 wherein the thread is stitched through the adhesive layer in parallel rows.

8. The web of claim 7 wherein the adhesive is normally tacky and pressure-sensitive.

9. The web of claim 8 wherein the adhesive is normally tacky and pressure-sensitive at room temperature.

10. The web of claim 9 wherein the face of the adhesive layer is provided with a removable release liner to form a transfer adhesive.

11. The web of claim 1 further comprising a removable oriented polymeric release liner over said adhesive layer wherein said thread is stitched through said liner and wherein said liner is readily tearable in the direction of orientation.

12. The web of claim 11 wherein the oriented liner is polyolefin or polyester.

13. The web of claim 12 wherein the oriented liner is polypropylene.

14. The web of claim 12 wherein the oriented liner is polyester.

15. The web of claim 1 wherein the pattern of electrically conductive thread along one face comprises a parallel pattern and the pattern of electrically conductive thread along the opposed face comprises a zigzag pattern.

* * * * *

UNITED STATES PATENT AND TRADEMARK OFFICE
CERTIFICATE OF CORRECTION

PATENT NO. : 5,308,667

DATED : May 3, 1994

INVENTOR(S) : Calhoun et al.

It is certified that error appears in the above-identified patent and that said Letters Patent is hereby corrected as shown below:

Col. 4, line 52    "strenoth" should be --strength--

Col. 6, line 64    "zigzag 0 fashion" should be --zigzag fashion--

Signed and Sealed this

Eleventh Day of April, 1995

*Attest:*

BRUCE LEHMAN

*Attesting Officer*    *Commissioner of Patents and Trademarks*